United States Patent

Rutkowski

Patent Number: 5,806,849
Date of Patent: Sep. 15, 1998

[54] ELECTRONIC GAME SYSTEM WITH WIRELESS CONTROLLER

[75] Inventor: Ricky Allen Rutkowski, Sunnyvale, Calif.

[73] Assignee: Electronic Arts, Inc., San Mateo, Calif.

[21] Appl. No.: 194,935

[22] Filed: Feb. 11, 1994

[51] Int. Cl.$^6$ .................................................. G11B 31/00
[52] U.S. Cl. ..................... 273/438; 273/434; 273/148 B; 345/158; 345/169
[58] Field of Search ................................ 273/148 B, 434, 273/438, 85 G, 437, DIG. 28; 345/158, 169; 434/350, 351

[56] References Cited

U.S. PATENT DOCUMENTS

| | | | |
|---|---|---|---|
| 3,315,375 | 4/1967 | Heinz | 434/351 X |
| 3,623,242 | 11/1971 | Hoover | 434/351 X |
| 3,952,425 | 4/1976 | Tanaka et al. | 235/52 |
| 4,179,124 | 12/1979 | Margolin | 273/85 G X |
| 4,477,069 | 10/1984 | Crudgington, Jr. | 273/85 G |
| 4,531,740 | 7/1985 | Green et al. | 273/148 B |
| 4,569,026 | 2/1986 | Best | 364/521 |
| 4,754,268 | 6/1988 | Mori | 345/158 |
| 4,771,344 | 9/1988 | Fallacaro et al. | 358/335 |
| 5,033,085 | 7/1991 | Rew | 345/169 |
| 5,149,104 | 9/1992 | Edelstein | 273/434 |
| 5,292,125 | 3/1994 | Hochstein et al. | 273/148 |

FOREIGN PATENT DOCUMENTS

| | | |
|---|---|---|
| 0118242 | 9/1984 | European Pat. Off. . |
| 3816488 | 11/1989 | Germany . |
| 9108178 | 10/1991 | Germany . |
| 4221118 | 1/1994 | Germany . |
| 4341291 | 11/1992 | Japan .................................... 273/438 |
| 5317524 | 12/1993 | Japan . |
| 6205010 | 7/1994 | Japan . |
| 2057174 | 8/1980 | United Kingdom ................... 273/438 |
| WO 93/23125 | 11/1993 | WIPO . |

*Primary Examiner*—Vincent Millin
*Assistant Examiner*—Kerry Owens
*Attorney, Agent, or Firm*—Phong K. Truong; Charles E. Gotlieb

[57] ABSTRACT

An electronic game system includes a game console, which accepts a game cartridge and runs the games stored therein, and a wireless controller for controlling actions in the game. The wireless controller includes a radio frequency transmitter for sending control signals to the console, and the console includes a receiver for receiving the control signals from the controller. Because the controller uses radio frequency signals instead of infrared signals to send information to the console, the controller may be operated at a large distance from the console. Thus, the game system of the invention may be used in long range applications wherein the console and the controller need to be separated by a relatively large distance.

14 Claims, 4 Drawing Sheets

ELECTRONIC GAME SYSTEM WITH WIRELESS CONTROLLER

FIELD OF THE INVENTION

This invention relates generally to game systems and more particularly to an electronic game system comprising a game console and a wireless controller, wherein the console and the controller may be operated a large distance apart from each other.

DESCRIPTION OF THE BACKGROUND ART

A typical electronic game system includes a main console and at least one hand-operated controller. The main console receives a game cartridge and runs the game stored therein, and the controller allows a player to control the actions taken in the game. A controller may take a number of different forms. For example, a controller may be a joystick, a steering mechanism, a power glove, a button controller, or the like. Whatever form the controller takes, in order for it to cooperate properly with the console, the controller somehow needs to convey its control signals to the console. In the controllers currently available, signal conveyance is usually achieved in one of two ways. First, the controller sends signals to the console by way of a direct coupling such as a cord. Second, the controller sends information to the console by way of infrared signals. These methods work adequately when the game system is used in a short range environment, but for long range applications (where the controller and console are separated by a large distance), they prove to be impractical and ineffective.

For long range applications, it is possible to use a cord to couple the controller to the console. However, the longer the range, the more impractical and inconvenient this method becomes. In the case of infrared signals, long range application is ineffective and sometimes, impracticable. This is true for at least two reasons. First, infrared signal transmission relies on a clear line-of-sight. If an object comes between the infrared source and the receiver, signal conveyance is interrupted, and if the signal source is not pointed properly at the receiver, signal reception is prevented. The farther the controller is from the console, the more difficult it becomes to properly coordinate the transmission and reception of infrared signals. Second, and more importantly, the range of infrared signals is limited by power considerations. To transmit infrared signals over a large distance, the amount of power required would be so immense that the implementation would be impracticable. For the reasons discussed above, the controllers currently available do not perform adequately when implemented in long range applications. Controllers, and games systems in general, having greater range are needed.

SUMMARY OF THE INVENTION

In accordance with the present invention, a long range game system is provided comprising a main console and at least one wireless controller, wherein the controller employs radio frequency signals to send information to the console. Because radio frequency signals are used rather than infrared signals, the controller need not be in a line-of-sight with the console, and may be operated at a relatively large distance (two miles or more) from the console.

The controller of the present invention preferably comprises a user interface, an encoder, a transmitter, and an antenna. The user interface, which preferably takes the form of a joystick and several depressable buttons, receives input from a user or player and generates control data in response to the user input. This control data is converted by the encoder into a set of serial data, which is then passed on to the transmitter. In response, the transmitter transforms the serial data into radio frequency signals and passes the radio frequency signals on to the antenna where the signals are transmitted to the console. Control signals are thus conveyed from the controller to the console. In addition to these components, the controller preferably further comprises a microphone, a modulator, and a second transmitter for allowing a user to send voice signals to other controllers, and a receiver, demodulator, and a speaker to allow the controller to receive voice signals from other controllers. These additional components allow a user to speak with other users or players during play.

The console of the present invention preferably comprises a game unit for accepting and running a game program, and a controller interface for receiving and processing the control signals received from the controller. The controller interface preferably includes an antenna for receiving the control signals from the controller, a receiver for transforming the radio frequency signals into serial data, a converter for converting the voltage level of the serial data to transistor-transistor logic (TTL) levels, a decoder for converting the serial data into a parallel data word, a plurality of latches for temporarily storing the data word from the decoder, and an interface control for interfacing the controller interface to the game unit. The interface control passes the control signals from the controller on to the game unit. Control signals are thus conveyed from the controller to the game unit.

In addition to coupling the controller interface to the game unit, the interface control preferably serves several other purposes. First, it multiplexes the data lines coupling the controller interface and the game unit so that a plurality of controllers can communicate with the game unit. This multiplexing allows an unlimited number of controllers to be used with the same console. Second, the interface control performs a security function to preclude the use of the controller interface with unauthorized games. These two aspects of the interface control give the console even greater flexibility and functionality.

DETAILED DESCRIPTION OF THE PREFERRED EMBODIMENTS

Figure 1:
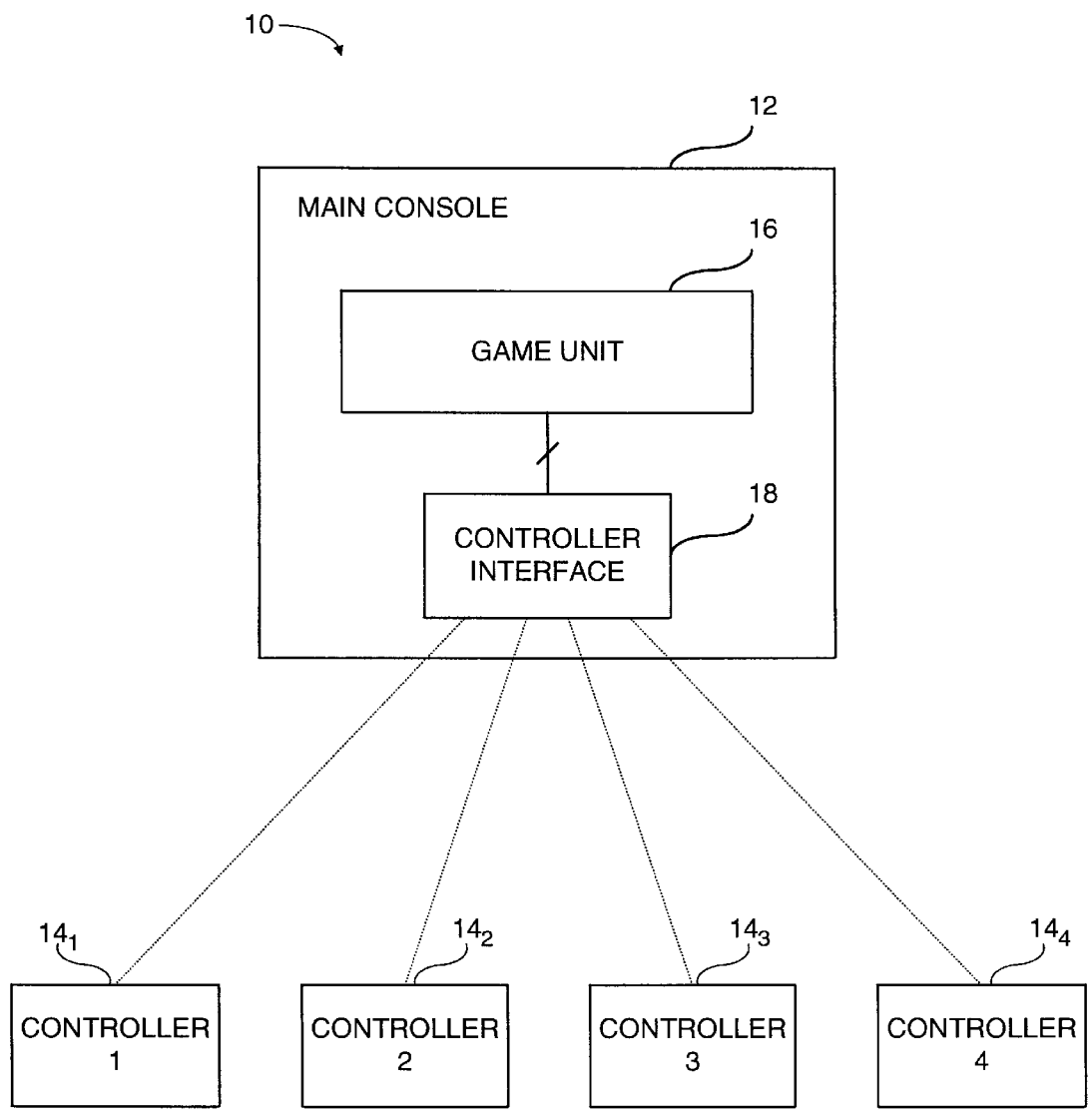
FIG. 1 is a block diagram representation of the system 10 of the present invention.

Referring to FIG. 1, there is shown a block diagram representation of the game system 10 of the present invention, wherein the system 10 preferably comprises a main console 12 and a plurality of wireless controllers $14_1$–$14_4$. The main console 12, which preferably comprises game unit 16 and controller interface 18, is primarily responsible for accepting and executing a game program. Preferably, the game program executed by console 12 is an interactive program which expects and is capable of receiving and processing user input signals during execution to control actions occurring within the game. Such a game, for example, may be a flight simulation game in which a player controls the flight of an airplane. Because the interactive program expects user input during execution, controllers 14 are provided to give a player the means to send control signals to the console to control actions within the game. Console 12 receives the control signals from the controllers and processes them in conjunction with the game instructions to incorporate the control signals into the game. This allows a player to control the movements and actions within the game. Together, the console 12 and controllers 14 provide a complete environment in which one or more players can interact with a computer game. For illustrative purposes, system 10 is shown and will be described as comprising four controllers 14. However, it should be understood that system 10 is not limited to four controllers but may be implemented using one or more controllers.

The controllers 14 of system 10 are preferably wireless controllers which send control information to the console 12 in the form of radio frequency signals. Preferably, each controller 14 transmits on a different frequency so that console 12 can determine which controller 14 is sending which control signals. The use of radio frequency signals instead of infrared signals significantly improves the functionality of the controllers 14. To elaborate, unlike infrared signals, radio frequency signals have no line-of-sight requirement. Thus, objects can pass between a controller 14 and the console 12 without interrupting signal reception. Also, radio frequency transmitters have much greater range than infrared transmitters. This means that controllers 14 may be used at a much greater distance (two miles or more) from console 12 than infrared controllers. Thus, unlike prior art game systems, system 10 may be used for long range applications. One possible application of such a long range system is that of game play within a stadium or arena. In such an application, the console 12 is coupled to a main display screen to display the electronic images generated by an interactive game program. The controllers 14 are given to selected members in the audience and, from their seats, the selected members control the action in the game displayed on the main screen. Such a setup can be used to entertain the audience during stoppages of play and during intermissions. This and other implementations are contemplated in the present invention.

Figure 2:
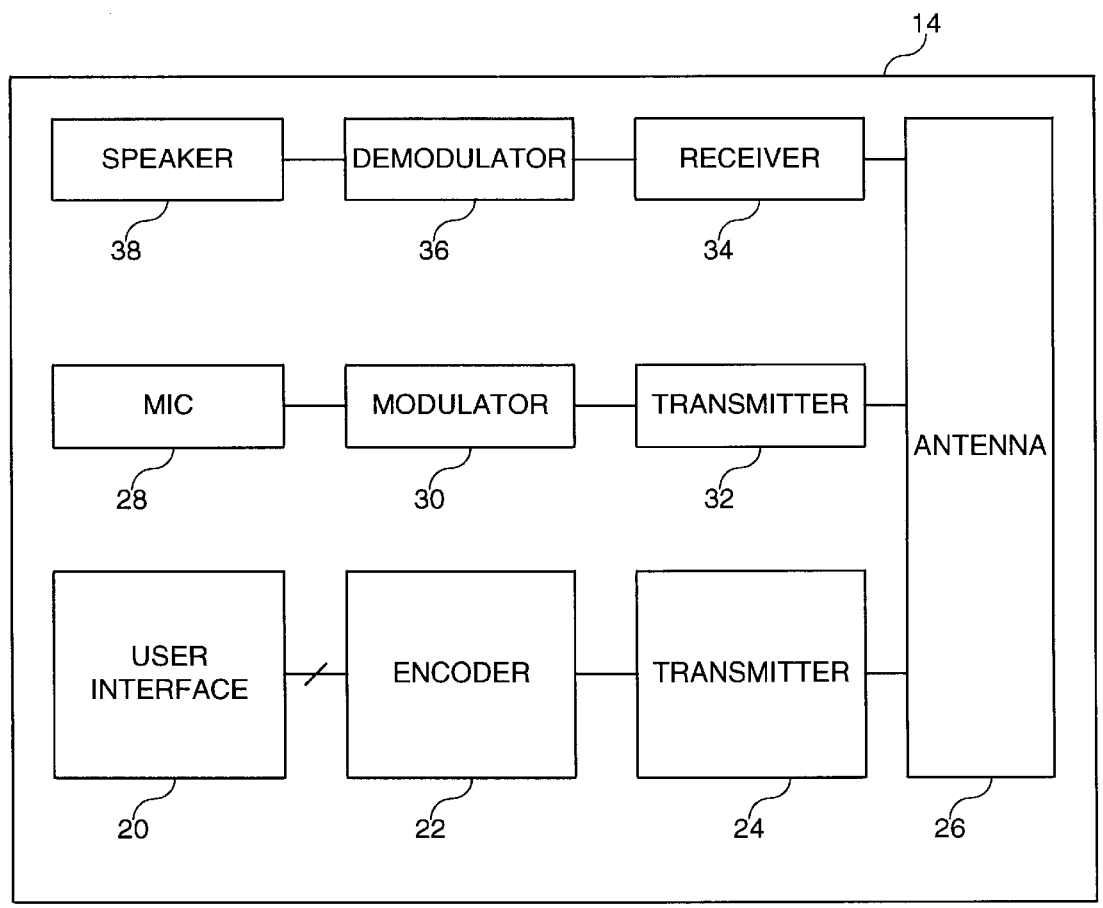
FIG. 2 is a more detailed block diagram of the controller interface 18 of the main console 12 of system 10.

With reference to FIG. 2, the controllers 14 of the present invention will now be described. FIG. 2 provides a detailed block diagram of one of the controllers 14 of system 10. Preferably, each controller 14 in the system 10 has the same components as that shown in FIG. 2. The only difference between the various controllers $14_1$–$14_4$ is that each transmits on a different frequency to allow the console 12 to distinguish among the controllers 14. Controller 14 preferably first comprises a user interface 20 for accepting user input. Interface 20 may take a variety of forms but in the preferred embodiment, interface 20 is preferably a combination of a joystick and four depressable buttons. The joystick preferably has four associated switches, one for each direction (up, down, right, left), and each button has one associated switch. The logical level of each switch represents a data bit. Together, the eight switches form an eight-bit control data word. The value of this control data word depends on how the joystick is moved and whether the buttons are depressed. The interface 20 thus generates control data based on user input.

After generation, the control data word is conveyed to encoder 22. Encoder 22, which may be an HT640 device available through Ming Engineering and Products, Inc. of City of Industry, California, receives the eight parallel bits of control data and converts the data into a set of serial data. The serial data is thereafter passed on to transmitter 24. Transmitter 24, which may take the form of an RS232 modem, transforms the serial data into radio frequency signals and sends these signals on to the antenna 26 where the radio frequency signals are broadcast. Control signals from the controller 14 are thus sent to the console 12.

In addition to the components already described, controller 14 preferably further comprises a voice communication system. On the transmission side, this communication system comprises a microphone 28 for converting voice signals to electrical signals, modulator 30 for transforming the electrical signals into radio frequency signals, and transmitter 32 for sending the signals onto antenna 26 where the signals are broadcast. On the reception side, the communication system comprises a receiver 34 for receiving signals captured by antenna 26, a demodulator 36 for demodulating the received signals to derive electrical signals therefrom, and a speaker 38 for converting the derived electrical signals into audio signals. Together, components 28–38 provide a voice communication system which allows players to speak to one another while they are using the controllers 14.

Figure 3:
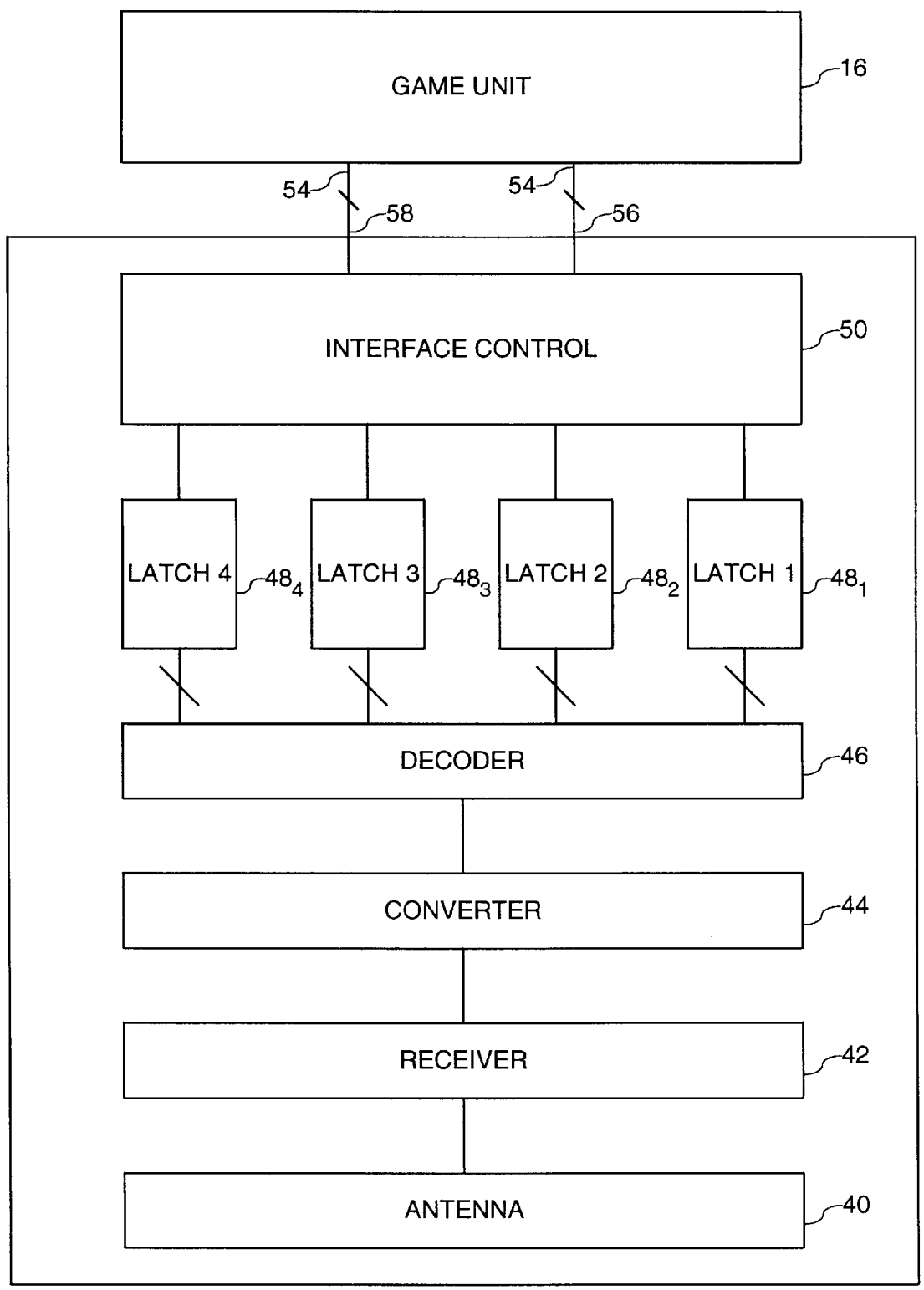
FIG. 3 is a more detailed block diagram of one of the controllers 14 in the system 10 of the present invention.

With reference to FIG. 3, the main console 12 of system 10 will now be described in greater detail. As previously noted, console 12 preferably comprises a game unit 16 and a controller interface 18. The game unit 16 primarily is responsible for accepting and executing a game program, while the controller interface 18 is responsible for receiving and processing control signals from each of the controllers 14. The game unit 16 may take a number of different forms but in the preferred embodiment, game unit 16 is a Sega Genesis game system manufactured by Sega of America, Inc., of South City, Calif. Game unit 16 accepts a game cartridge, a compact disk, or some other storage medium and executes the game program stored thereon. Preferably, the game program is an interactive one which expects and processes control signals received from outside sources. External control signals may be received by game unit 16 through ports 52 and 54.

The controller interface 18 couples to game unit 16 through ports 52 and 54. Controller interface 18 preferably comprises antenna 40, receiver 42, converter 44, decoder 46, latches $48_1$–$48_4$, and interface control 50. Antenna 40 receives all of the radio frequency signals sent by the controllers 14 and conveys these signals to receiver 42. Receiver 42, which may be an RS232 modem, takes the radio frequency control signals received from antenna 40 and transforms them into serial data signals. Recall that each of the controllers $14_1$–$14_4$ transmits signals on a different frequency. Thus, in order to receive and transform control signals from all of the controllers $14_1$–$14_4$, receiver 42 preferably monitors each frequency on a periodic basis (i.e. "polls "each of the four frequencies periodically) to derive information signals therefrom. After receiver 42 transforms radio frequency signals into serial data signals, the serial data signals are not at TTL logic levels but are instead at 12V logic levels. To make the serial data signals compatible with typical logic components, converter 44 changes the serial data signals into TTL level signals.

Thereafter, the serial data signals are sent to decoder 46 where they are converted into a parallel data word. Decoder 46 may take a number of different forms but in the preferred embodiment, decoder 46 is an HT648L device available from Ming Engineering and Products, Inc. of City of Industry, California. After the control data is changed to a parallel data word, the data word is latched into one of the latches $48_1$–$48_4$. Each latch corresponds to one of the controllers 14 and which latch is enabled depends on which controller originally sent the control data word. Preferably, each of the latches $48_1$–$48_4$ is enabled on a periodic basis and the enabling of each latch is preferably synchronous with the polling of each frequency. This ensures that each latch receives control data from the proper controller. To illustrate, when the frequency corresponding to controller1 is polled, the latch corresponding to controller1 should be enabled so that control signals from controller1 are stored in the proper latch. Similarly, when the frequency corresponding to controller2 is polled, the latch corresponding to controller2 should be enabled. The same logic applies to the enabling of the other latches. Once control data from the controllers 14 have been received, converted, and stored in latches $48_1$–$48_4$, the data is ready to be conveyed to game unit 16 to be processed therein. Interface control 50, which is coupled to each of the latches $48_1$–$48_4$, determines if and when the stored data signals are passed on to game unit 16.

Figure 4:
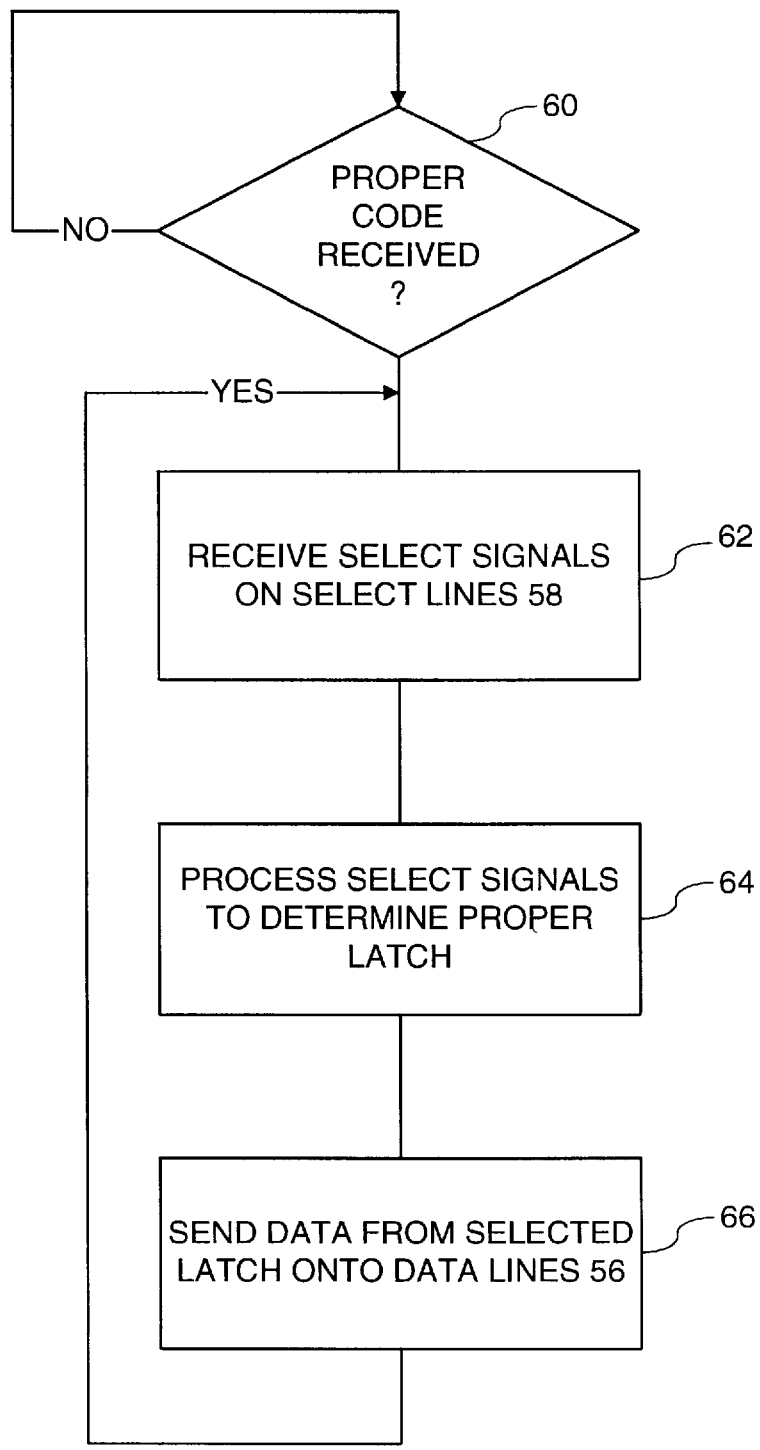
FIG. 4 is an operational flow diagram for the interface control 50 of controller interface 18.

With reference to FIG. 4, an operational flow diagram for interface control 50 is provided to describe the interface control 50 in greater detail. Interface control 50 performs two major functions. First, it carries out a security/verification function to ensure that only certain game programs are used in conjunction with the controller interface. Upon initialization, the game program executed by game unit 16 preferably sends a code word to interface control 50 through port 54. Interface control 50 receives this code word and determines 60 whether it is a proper code word. If not, interface control 50 will not send any control data to the game unit 16. In effect, controller interface 50 renders itself inactive. However, if the proper code is received, then interface control 50 proceeds to carry out its second function, which is a multiplexing function.

Notice from FIG. 3 that the game unit 16 has only two ports, 52 and 54. Each port, in typical operation, is coupled to a controller (not shown) to receive controls signals therefrom. Because there are only two ports, and since each port is coupled to a respective controller, game unit 16 can typically accommodate only two controllers. To interface more than two controllers to game unit 16, interface control 50 multiplexes the signal lines 56, 58 coupling game unit 16 and controller interface 18, using lines 58 as select lines and lines 56 as data lines. In operation, interface control 50 receives 62 select signals on select lines 58. These select signals, which are preferably generated by the game program executed by game unit 16, indicate from which controller 14 control signals are needed. Interface control 50 processes 64 the select signals to determine which latch $48_1$–$48_4$ to retrieve data from and, thereafter, interface control 50 sends 66 the data from the selected latch onto data lines 56. Control data is thus conveyed to game unit 16 to be processed therein. By multiplexing lines 56 and 58 in the manner described, an unlimited number of controllers 14 may be interfaced with game unit 16 to allow an unlimited number of players to play a game at the same time. Thus, interface control 50 makes it possible for a large number of players to participate in the same game even though game unit 16 provides only two ports. Interface control 50 may be implemented in a number of different ways. In the preferred embodiment, interface control 50 is implemented using hard-wired logic components. However, the functions of interface control 50 may also be carried out using a processor and a control program. These and other implementations are within the scope of the present invention.

What is claimed is:

1. In an electronic game system comprising a main console for running a game program, a controller for use in said system for sending control signals to said console, said controller comprising:

a user interface for detecting input from a user and generating control data in response to said input;

an encoder for converting said control data into serial data;

a radio frequency transmitter for transforming said serial data into a first set of radio frequency signals;

an antenna coupled to said transmitter for sending said radio frequency signals to said console; and a communication means coupled to said antenna for receiving and transforming a second set of radio frequency signals into a first set of audio signals, and for transforming a second set of audio signals into a third set of radio frequency signals and transmitting said third set of radio frequency signals.

2. The controller of claim 1, wherein at least a portion of the first set of audio signal is contained in the second set of audio signals.

3. The controller of claim 2, wherein said communication means comprises:

a microphone for converting audio signals into electrical signals;

a modulator coupled to said microphone for converting the electrical signals into said third set of radio frequency signals; and a second transmitter coupled to said modulator for sending said third set of radio frequency signals to said antenna for broadcasting.

4. The controller of claim 3, wherein said communication means further comprises:

a receiver coupled to said antenna for receiving said second set of radio frequency signals from said antenna;

a demodulator coupled to said receiver for converting said second set of radio frequency signals into a second set of electrical signals; and a speaker coupled to said demodulator for transforming said second set of electrical signals into audio signals.

5. An electronic game console, comprising:

a game unit for executing a game program; and a controller interface for receiving and processing radio frequency control signals from at least one controller, said controller interface comprising:

a receiver for receiving and transforming said radio frequency control signals into serial data signals;

a decoder coupled to said receiver for converting said serial data signals into parallel data signals; and an interface control coupled to said game unit and said decoder for receiving a code from said game unit and determining whether said code is valid, and in response to a determination that said code is invalid, said interface control is inactivated to inhibit passage of said parallel data signals to said game unit.

6. The electronic game console of claim 5, further comprising a plurality of storage devices coupled to said decoder for receiving and storing said parallel data signals, and coupled to said interface control for providing said parallel data signals to said interface control.

7. The electronic game console of claim 6, wherein said interface control is coupled to said game unit via a set of select lines and a set of data lines, and said interface control multiplexing said data lines to send said parallel data signals from said storage devices to said game unit.

8. An electronic game system, comprising:

a game unit for executing a game program;

a controller interface for receiving and processing a first set of radio frequency control signals to derive parallel data signals, said controller interface coupled to said game unit for receiving a code from said game unit and determining whether said code is valid, and in response to a determination that said code is invalid, at least a portion of said controller interface is inactivated to inhibit passage of said parallel data signals to said game unit; and at least one controller for sending said radio frequency control signals to said controller interface.

9. The game system of claim 8, wherein said controller interface is inactivated to prevent the passage of said parallel data signals to said game unit.

10. The game system of claim 8, further comprising a plurality of storage devices coupled to said decoder for receiving and storing said parallel data signals, and coupled to said controller interface for providing said parallel data signals to said controller interface.

11. The game system of claim 10, wherein said interface control is coupled to said game unit via a set of select lines and a set of data lines, said interface control multiplexing said data lines to send said parallel data signals from said storage devices to said game unit.

12. The game system claim 8, wherein said controller further comprising a communication means coupled to an antenna for receiving and transforming a second set of radio frequency signals into audio signals, and for transforming a second set of audio signals into a third set of radio frequency signals and transmitting said third set of radio frequency signals, said communication means allowing a user to speak with other users using said controller.

13. The game system of claim 12, wherein said communication means comprises:

a microphone for converting said second set of audio signals into electrical signals;

a modulator for converting the electrical signals into said third set of radio frequency signals; and a transmitter for sending said third set of radio frequency signals to said antenna for broadcasting.

14. The controller of claim 13, wherein said communication means further comprises:

a receiver for receiving said second set of radio frequency signals from said antenna;

a demodulator for converting said second set of radio frequency signals into a second set of electrical signals; and a speaker for transforming said second set of electrical signals into said audio signals.

* * * * *